US005252779A

United States Patent [19]

DiRienzo

[11] Patent Number: 5,252,779

[45] Date of Patent: Oct. 12, 1993

[54] ELECTRICAL SPLICE ENCLOSURE

[76] Inventor: Orlando N. DiRienzo, P.O. Box 49, Pottersville, N.J. 07979

[21] Appl. No.: 905,329

[22] Filed: Jun. 29, 1992

Related U.S. Application Data

[63] Continuation-in-part of Ser. No. 726,918, Jul. 8, 1991.

[51] Int. Cl.[5] .............................................. H02G 15/08

[52] U.S. Cl. .................................. 174/87; 174/74 R; 174/76; 174/84 R

[58] Field of Search ..................... 174/74 R, 74 A, 76, 174/84 R, 87, 83, 93, 138 F

[56] References Cited

U.S. PATENT DOCUMENTS

| | | | |
|---|---|---|---|
| 2,925,461 | 2/1960 | Anderson | 174/87 |
| 3,937,870 | 2/1976 | Bumpstead et al. | 174/87 |
| 4,227,103 | 10/1980 | Humes, Jr. et al. | 174/74 A X |
| 4,698,533 | 10/1987 | Kindig et al. | 174/87 X |
| 4,707,567 | 11/1987 | Blaha | 174/87 |
| 4,751,350 | 6/1988 | Eaton | 174/87 |
| 4,803,779 | 2/1989 | Blaha | 174/87 X |
| 4,839,473 | 6/1989 | Fox et al. | 174/87 X |
| 5,038,003 | 8/1991 | Allec et al. | 174/87 X |
| 5,162,617 | 11/1992 | Ferbas | 174/87 X |

FOREIGN PATENT DOCUMENTS

| | | | |
|---|---|---|---|
| 557587 | 5/1958 | Canada | 174/87 |
| 568195 | 12/1958 | Canada | 174/87 |
| 114982 | 5/1926 | Switzerland | 174/87 |

*Primary Examiner*—Morris H. Nimmo
*Attorney, Agent, or Firm*—Kinzer, Plyer, Dorn, McEachran & Jambor

[57] ABSTRACT

Water-resistant electrical splice enclosure characterized by a tube for a contained wire connector, wherein a cone presenting flexible lock fingers is insertable into the open end of the enclosure tube to permit passage and entry into the tube of connectors of different size, to resist removal of a connector out of the tube, and to restrain or limit displacement of the waterproofing composition which may be present.

9 Claims, 3 Drawing Sheets

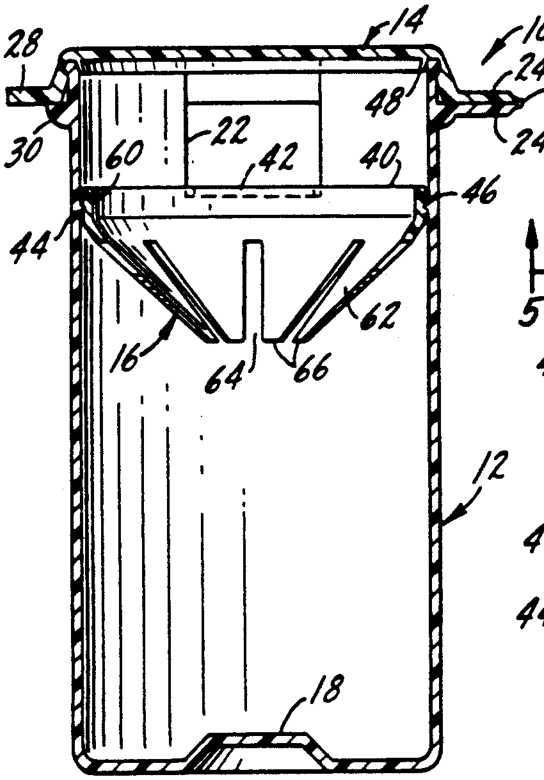
Fig. 1.
Fig. 4.
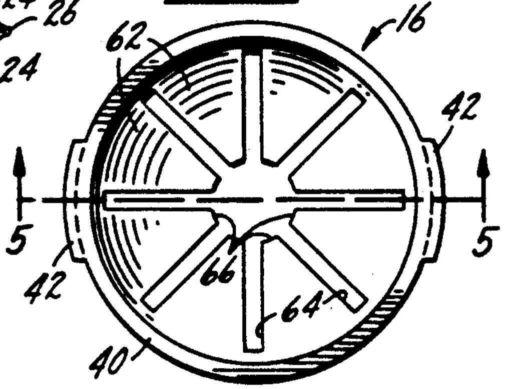
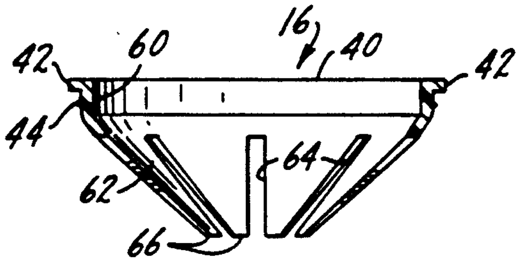
Fig. 5.
Fig. 3.
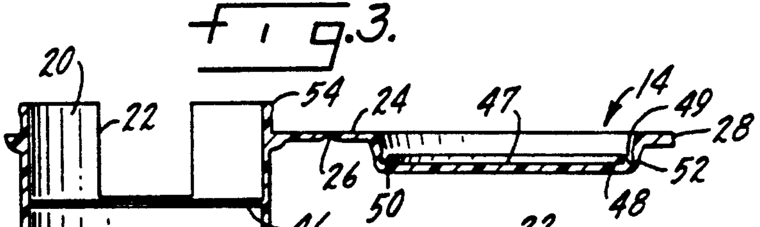
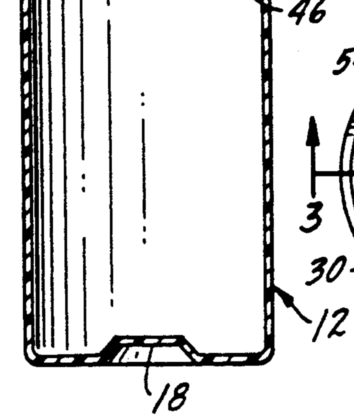
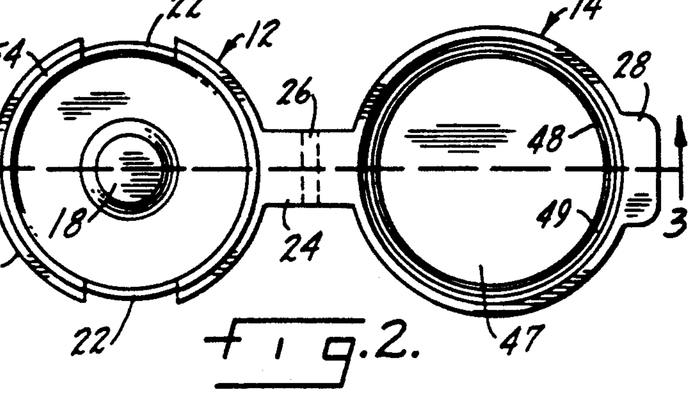
Fig. 2.

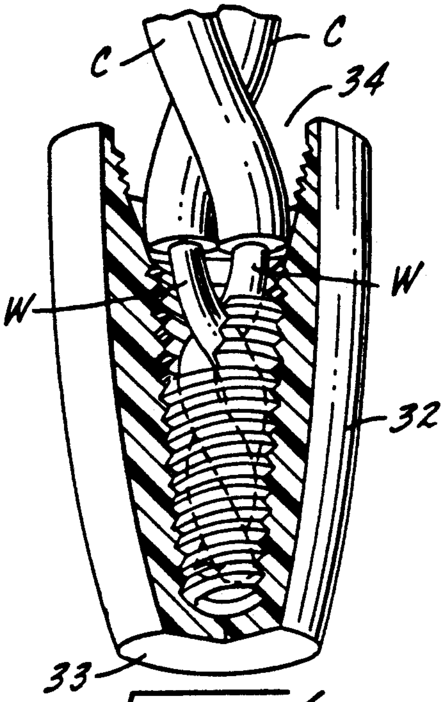
Fig. 6.
Fig. 7.
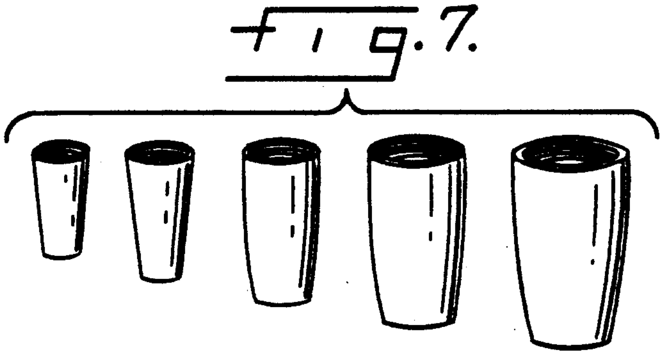
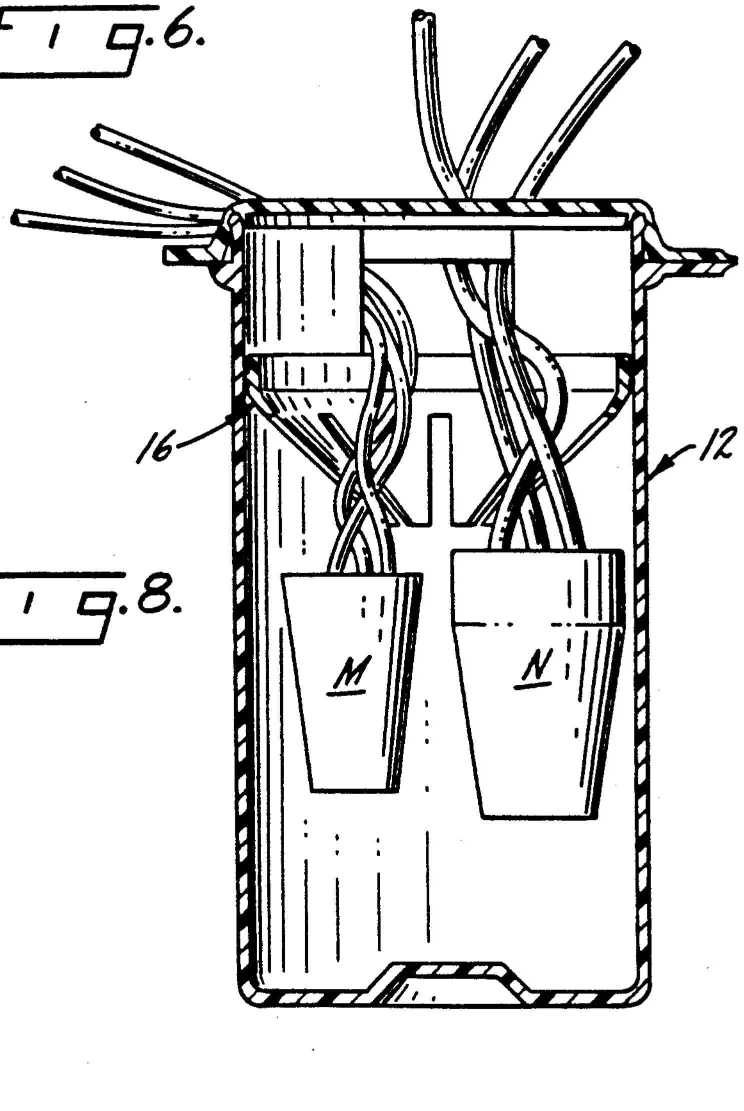
Fig. 8.

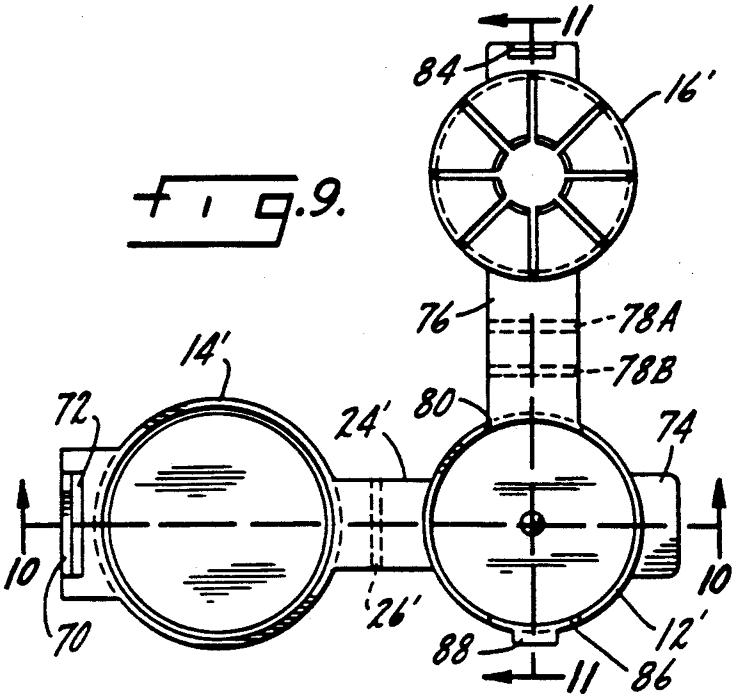
Fig. 9.
Fig. 12.
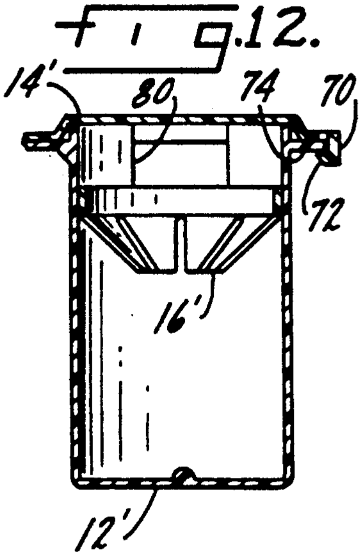
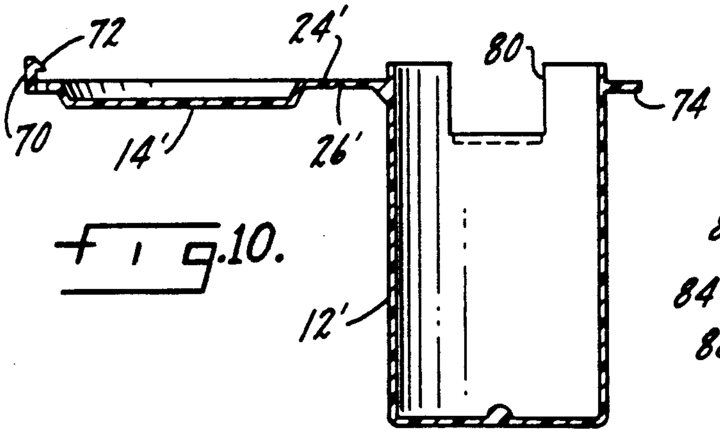
Fig. 10.
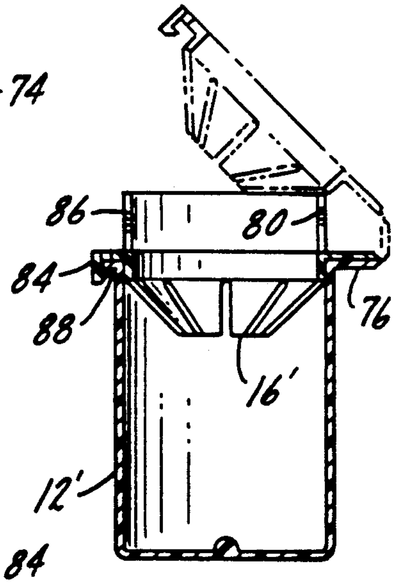
Fig. 13.
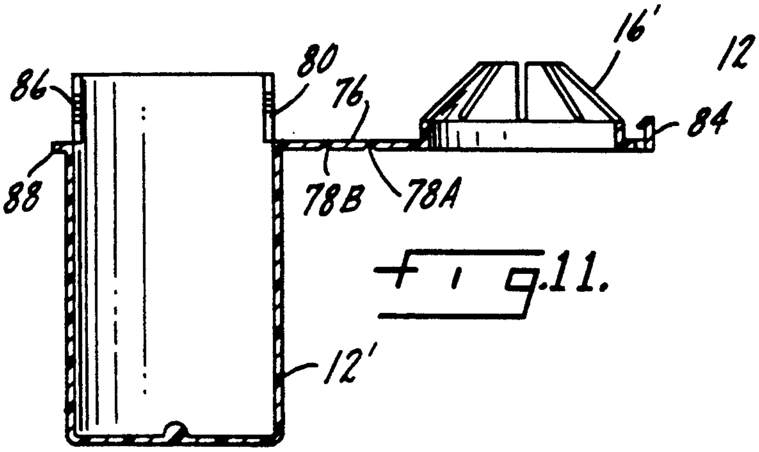
Fig. 11.

ELECTRICAL SPLICE ENCLOSURE

REFERENCE TO A RELATED APPLICATION

This application is a continuation-in-part of application Ser. No. 07/726,918 filed Jul. 8, 1991.

FIELD OF THE INVENTION

The present invention relates to a waterproof electrical splice enclosure of the kind wherein the bare ends of the conductor wires, inside an encapsulating cylinder, are held twisted or spliced by an insulating connector.

BACKGROUND OF THE INVENTION

Waterproof electrical wire enclosures are employed where damage or short-circuiting can be expected from moisture conditions or even flooding conditions. Typical examples are golf courses and underground sprinkler systems utilizing buried wiring, and especially those systems having solenoid-operated valves. Wiring at nature center waterfalls, flood-lighted landscaping, and rock gardens are additional examples. But regardless of the circumstances giving rise to the need for an encapsulated splice, the assembly or kit will include an insulating cylinder of sufficient size to receive the insulation-covered wire conductors, a connector which joins the bare or uncovered wire ends and a waterproofing compound such as a gel or grease. Usually the connector is a thimble-shaped twist-on or screw-on connection, but other connections are also employed such as set screw, crimp and split bolt connectors.

The waterproofing compound is usually added to the capsule first. The bared or uncovered wire ends are in effect spliced or joined conductively by the connector, and the spliced connection thus made is inserted into the capsule or cylinder where it is covered by the waterproofing compound resulting in a waterproofed sealed electrical juncture.

The present invention addresses the problem of assuring the splice thus completed cannot be removed from the encapsulating tube or cylinder either by inadvertence or by accidental or unexpected forces. The means by which this is accomplished also allows several connectors to be incorporated within one tube and, in addition, serves to keep the waterproofing compound in place so that the wire nut remains fully covered.

Regarding means to prevent removal, the best prior art of which I am aware is U.S. Pat. No., 4,839,473 in which there are retaining barbs molded integral with the inside diameter of the encapsulating tube.

The primary object of the present invention is to more efficiently prevent removal of the connector than has heretofore been proposed or achieved, to enable connectors of various sizes (large to small inside and outside diameter) to be effectively blocked against removal, to enable one tube to receive and hold at least two connectors and at the same time to afford a plug or stopper which restrains or limits the tendency of the waterproofing compound to flow during insertion of the wire connection, assuring the encapsulated compound flows around the entire connector.

SUMMARY OF THE INVENTION

The invention needs to be summarized by referring first to the form and function of the connector.

The connector, for example, may be of thimble form in that it is somewhat cone-shaped with a closed end and an open end. Inside the connector are screw-on threads or the equivalent such that when the wire ends are inserted into the hollow connector, which is then twisted, the ends of the wires are twisted by the connector screws to complete a tight connection.

The connector in turn is inserted into the waterproofing tube, from the open end of the tube.

Under the present invention a truncated, cone-shaped lock is to be inserted into the tube or capsule. The cone is flexible, narrow end pointing toward the closed end of the tube, and will allow several connectors to be pushed therethrough. In the reverse sense, the lock will prevent outward removal of a connector located in the tube.

More specifically, a plurality of flexible fingers depend from the wide base of the cone. The fingers taper toward the narrow end of the lock and define a small diameter. When a connector is inserted, the free ends of the fingers will flex to allow passage of the connector into the waterproofing compound. In the event the connector tends to be displaced toward the (capped-off) end of the tube, the fingers engage the connector in an interference contact and prevent further outward movement.

The diameter of the lock at the narrow end is so chosen as to permit insertion and passage of wire connectors of various sizes, from the largest to the smallest, and also allows two smaller connectors to be inserted into the same tube. This is of particular advantage in those instances where the underground wiring involves solenoid valves, requiring two connectors which can be accommodated by one enclosure under the present invention in comparison to the prior art enclosure in which the internal retaining barbs and size allow room for only one connector so that two tubes are needed.

The twist-on or screw-on connectors are typified by the disclosure in many patents, particularly those of Ideal Industries, Inc. such as U.S. Pat. Nos. 4,707,567, 4,803,779 and 4,985,991. Minnesota Mining and Manufacturing Company is also a supplier of twisted on or wire connectors, and indeed one is shown in aforementioned Pat. No. 4,839,473. However, as noted, the enclosure of the present invention will accommodate other kinds of connectors.

DESCRIPTION OF THE DRAWINGS

FIG. 1 is a sectional view of an electrical splice enclosure constructed in accordance with one embodiment of the present invention;

FIG. 2 is a reduced top plan view of the enclosure shown in FIG. 1 with the closure cap extended to open position;

FIG. 3 is a sectional view on the line 3—3 of FIG. 2;

FIG. 4 is an enlarged top plan view of the locking cone which features in the present invention;

FIG. 5 is a sectional view taken on the line 5—5 of FIG. 4;

FIG. 6 is an enlarged sectional view, in perspective, with the open (upper) end of the connector as if it were facing toward the upper end of the enclosure as shown in FIG. 3;

FIG. 7 presents a collection of connectors of various inside diameter progressively larger left to right;

FIG. 8 is a view similar to FIG. 1 with two typical connectors in place;

FIG. 9 is a top plan view of a second embodiment of the invention;

FIG. 10 is a sectional view taken on line 10—10 of FIG. 9, but omitting background detail for clarity;

FIG. 11 is a sectional view taken on line 11—11 of FIG. 9, but omitting background detail for clarity;

FIG. 12 shows the second embodiment in its assembled or nested form; and

FIG. 13 shows movement of the cone to its inserted position and omitting background detail for clarity.

ONE EMBODIMENT OF THE INVENTION

An enclosure assembly, constructed in accordance with the present invention, is identified as 10 in FIG. 1. It is injection molded of polypropylene and includes a tube or cup 12, a closure cap 14 and a cone-shaped lock 16 nested inside. The lock 16 is separately molded (injection) of polypropylene. The bottom of the tube is strengthened by a concavity 18. The cone 16 has flexible fingers, as will be explained, allowing a connector to be pushed therethrough.

FIGS. 2 and 3 are reduced views. The tube and cap are molded integrally. The open end 20 of the tube has two 180° displaced recesses as 22 enabling the insulated running ends of the conductors C (see FIG. 6) to be passed therethrough.

The closure cap 14 is joined to one side of the tube at the open end by a flap 24 presenting a so-called living hinge 26. The cap is held closed by a snap fit over the open end of the tube as will be explained. The cap can be opened or displaced to open position by a finger force applied to a tab element 28. In closed position, FIG. 1, the tab engages a stop element 30 at the side of the tube opposite the flap 24.

Insulation will be removed from the conductors C to expose the wire ends W to be spliced as shown in FIG. 6. The splice is a twist made by the twist-on connector (plastic) 32, FIG. 6. The connector has a closed end 33 and an open end 34. This twist connection operation is well known, easily perceived and need not be explained further. Reference may be made to the patents identified above. The wide (open) end of the connector when inserted into the tube will face the open end of the capsule or tube 12. The connector shown in FIG. 6 is purposely oriented in this direction so that it can be perceived that if the connector 32 should encounter forces tending to move it upward, it will move toward the locking cone, FIG. 1.

The locking cone 16 has a wide base 40, FIGS. 1 and 5. Its outer diameter fits the inside diameter of the tube. To locate the lock in place the base 40 of the locking cone is provided with two 180° displaced flanges 42 which will seat on the bottom edge of the recesses 22 as denoted by the dashed line in FIG. 1. Also, the lock is secured by a detenting or snap fit to the tube, preferably by interfering snap-over ribs or protuberances. To this end, the base of the cone lock is formed with an outer annular rib or tongue 44, FIG. 5, and the inside diameter of the tube has an inwardly facing annular rib 46, FIG. 3. When the cone 16 is pressed home, the rib 44 on the cone 16 snaps over the rib 46 on the tube. It will be realized that other types of interference fit, snap-fit or press-fit, could be used such as a tongue-in-groove to secure the lock 16.

The cap is held closed by an interference fit over the open end of the tube 12. The inside face 47 of the cap top, FIG. 3, has a flexible annular camming rib 48 spaced radially inwardly from an opposed annular surface 50 presented at the inside face of a rim 52 of the closure cap, defining between them an annular recess element 49, FIG. 3. The width of the annular recess 49 is such as to snugly receive a press fit element in the form of an annular bead 54, FIG. 3, which defines and limits the open end of the tube. The cap is secured in closed position by a press fit (snap fit) of the bead 54 into the recess 49 as can be seen from FIG. 1. Equivalent or other forms of snap fits may be used as will be explained below.

The lock 16 is cone-shaped as noted, with the wide base 40 uppermost in the orientation position shown in FIG. 1. Immediately beneath or beyond the base 40, the locking cone 16 has an annular rim 60 and the interference rib 44 is on the outer face of the rim 60.

Dependent from the rim 60 are a plurality of flexible fingers 62, preferably eight in number. The fingers are sloped radially inward toward the longitudinal axis of the tube, defining in effect the sloped side of the cone 16. The fingers are separated by spaces 64 and terminate in free ends 66.

The dimensioning of the tube in width (and length) is such that it will accept at least two connectors, the same or different in size. In any event, after a splice is made, the connector will be pushed through the locking cone, the fingers flexing to allow passage; and likewise for a second connector if the underground wiring requires one, so that there will be two connectors inside the tube, submerged in the waterproofing compound (not shown). It can be readily recognized from a comparison of FIGS. 1 and 6 that if a connector as 32, located inside the tube 12, should be yanked or otherwise forcefully displaced to engage the narrow end of the cone lock, one or more or all of the free ends 66 of the fingers 62 will block further passage of the connector 32. Indeed, one or more of the fingers will be displaced inward toward the axis of the cone lock narrowing, if not closing, the opening at the narrow end of the cone.

Thus, and referring to FIG. 8, two connectors M and N are positioned inside the tube 12 described in connection with FIG. 1. The connectors M and N are to be considered as of generic shape, that is, any of the styles of connectors whether screw-on, split-bolt or crimp-on. Each connector (M, N) is easily passed into the tube through the cone 16 but neither will pass the cone in the opposite direction.

It will be readily perceived from FIG. 8 that whether there is only one connector, or two, inside the capsule, upward displacement into contact with the free ends of the cone fingers will press or squeeze a finger inward toward the longitudinal axis of the tube, obstructing passage of the connector.

As an indication of dimensions, the tube may have a length, top to bottom, of about 2.6 inches, the cone has a height of about 0.56 inches, the diameter of the tube is about 1.3 inches and the wall thickness of the tube is about 0.04 inches.

A further attribute of the present invention is that if the waterproofing compound is one which easily flows, the lock 16 will serve as a partial plug, restraining this flow during displacement by connectors when the connector is tilted. Consequently, there is more assurance of a positive encapsulation.

The array of connectors shown in FIG. 7 (illustrative; not limiting as to style) is to give an idea of the extent of variant sizes in terms of diameter and length. In actual practice, it may be adequate in a practical sense to have the ends of the cone allow passage of two of the larger connectors (naturally a smaller one will pass); the narrow end of the locking cone 16 will have a diameter preventing displacement of the smaller connector in the opposite direction and of course will naturally block displacement of the larger connector; it depends on the field use.

PREFERRED EMBODIMENT

The preferred embodiment is best shown in FIGS. 9 and 12 wherein the tube, closure cap and lock are (injection) molded as a one-piece assembly. These three parts serve the purpose and function of those described above. Similar reference characters are thereafter employed with a prime symbol added.

A top plan view with the parts spread apart is shown in FIG. 9. The tube or cap is indicated at 12′, the closure cap is 14′ and the insertable lock is 16′.

The closure cap is molded with and united to the cap by a flap 24′ having a living hinge 26′ as described above. A preferred latch holds the cap closed by a snap fit. The latch is in the form of a hook or tooth element 70, FIG. 10, which has a sloped face or camming surface 72 which snaps by a press fit over the free edge of a lip element 74 at the upper or open end of the tube as shown in FIG. 12. The hook 70 and lip 74 are diametrically opposite one another as can be seen in FIG. 9.

The lock cone 16′ has the configuration and function described above but, like the closure cap, is joined to the upper open end of the tube by a flap 76 having two living hinges 78A and 78B. It will be noted in FIG. 9 that the flap 76 for the cone-shaped lock is displaced 90° clockwise from the closure cap.

As in the foregoing embodiment, the wide base of the cone has a diameter substantially equal to the inside of the diameter so that there is a touching fit between the tube and cone when the latter is in home position, FIG. 13. When the cone is thus inserted, the proximal part of the flap 76, near the tube 12′, fits into a slot or recess 80 (see FIG. 9) at the upper end of the tube 12′, leaving ample room for insertion of wires through recess 80. Further to secure the locking cone, it also has a latch finger or hook element 84, FIG. 9, at the side opposite its hinge flap. Hook 84 is related to and fits in a recess 86 at the side of the tube opposite recess 80. The finger element 84 mates by a press or snap fit to a lip element 88 on cap 12′ as shown in FIG. 13.

In connection with the figures showing the second (preferred) embodiment, any attempt to show the cone in FIG. 10 or the cap in FIG. 11 would confuse rather than inform, and this statement also applies to FIG. 13.

The second one-piece embodiment is easier to manufacture, there are no separate parts to track and packaging is easier.

It will be recognized from the foregoing that the lock is one-way in nature, allowing insertion of a connector, but preventing its removal. The flexible fingers, narrowing or sloping inwardly toward the closed end of the tube, allow these opposed actions. The width of the cone at the base is selected to allow passage of a larger connector (and of course a smaller one as well) into the bottom or lower section of the tube where the waterproofing substance is present. The smaller diameter of the truncated cone is so chosen as to interfere with (stop) movement of connectors of different sizes in the opposite direction, even if there are two connectors side-by-side or atop another inside the tube. The fingers are of such flexibility that a connector which will pass the wide end of the cone will also pass the fingers during insertion.

The principal advantage of utilizing the cone lock is that many more sizes of connectors can be accommodated compared to the proposition of retention barbs or hooks molded integral with the tube at the inside of the diameter. Also, there is versatility in that at least two or more connectors can be accommodated, which is of particular importance in those instances where the underground wiring is of small size and involves solenoid valves.

It may be advantageous to mold the tube to include a divider parallel to the longitudinal axis affording a vertical partition defining two compartments beneath the position occupied by the inserted cone.

Hence, while I have illustrated and described two embodiments of the present invention, it is to be understood that these are capable of equivalent variations and modifications.

I claim:

1. Electrical splice enclosure comprising an elongated hollow tube closed at one end and having an opposed open end enabling insulation-covered electrical conducting wires to be positioned within the tube along with a connector which conductively joins the wire ends when bare;

a closure cap for closing the open end of the tube;

a lock insertable into the open end of the tube, said lock being a hollow truncated cone having a sloping side depending from an wide base nested inside the open end of the tube;

the sloped side of said cone being defined by a plurality of separate flexible fingers projecting from the cone base in the direction of the closed end of the tube, said fingers being inclined inwardly toward the longitudinal axis of the tube and terminating in free ends which define the narrow end of the truncated cone whereby the fingers will flex outwardly to allow insertion of a connector into the tube but will oppose removal of the connector in the opposite direction.

2. Enclosure according to claim 1 wherein the tube is of such size as to accept at least two connectors of variant size.

3. Enclosure according to claim 1 in which the diameter of the cone base is substantially the same as the inside diameter of the tube.

4. Enclosure according to claim 1 in which the closure cap and locking cone have interfitting press fit elements holding the cone in its inserted position and the cap in its closing position.

5. Enclosure according to claim 3 in which the closure cap and locking cone have interfitting press fit elements holding the cone in its inserted position and the cap in its closing position.

6. Enclosure according to claim 1 in which the tube, closure cap and lock are molded as one piece.

7. Electrical splice enclosure comprising an elongated hollow tube closed at one end and having an opposed open end enabling insulation-covered electrical conducting wires to be positioned within the tube along with a connector which conductively joins the wire ends when bare;

a closure cap for closing the open end of the tube;

a separate lock insertable into the open end of the tube to prevent displacement of the connector, said lock being cone shaped with inwardly directed flexible fingers, the cone being secured in place by an interference fit between elements on the cone and tube;

said fingers being inclined inwardly toward the longitudinal axis of the cylinder and terminating in free ends which define the narrow end of the lock whereby a connector not larger than the inside diameter of the cone may be pushed past the flexible fingers into the space in the tube therebeyond while movement of the connector in the opposite direction is prevented by the free ends of the fingers.

8. Enclosure according to claim 7 in which the elements on the closure cap and tube hold the closure cap in its closing position.

9. Enclosure according to claim 7 in which the tube, closure cap and lock are molded as one piece.

* * * * *